(12) United States Patent
Nadav

(10) Patent No.: US 12,099,541 B1
(45) Date of Patent: Sep. 24, 2024

(54) SYSTEMS AND METHODS FOR AUTOMATED RULE-BASED ANNOTATION AND VALIDATION OF BUSINESS CLASSIFICATION

(71) Applicant: Wells Fargo Bank, N.A., San Francisco, CA (US)

(72) Inventor: Carmel Nadav, Egan, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/347,959

(22) Filed: Jul. 6, 2023

(51) Int. Cl.
- *G06F 16/00* (2019.01)
- *G06F 16/33* (2019.01)
- *G06F 16/35* (2019.01)

(52) U.S. Cl.
CPC ........ *G06F 16/353* (2019.01); *G06F 16/3331* (2019.01)

(58) Field of Classification Search
CPC .................................................. G06F 16/353
See application file for complete search history.

(56) References Cited

U.S. PATENT DOCUMENTS

| | | | |
|---|---|---|---|
| 10,055,452 B2 | 8/2018 | Blanco et al. | |
| 11,487,991 B2 | 11/2022 | Zhiltsov | |
| 2014/0330594 A1 | 11/2014 | Roberts et al. | |
| 2021/0056569 A1* | 2/2021 | Silberman | G06N 7/01 |

OTHER PUBLICATIONS

Wood, et al., Automated Industry Classification with Deep Learning, pp. 122-129, 2017 IEEE International Conference on Big Data.

* cited by examiner

*Primary Examiner* — Ajith Jacob
(74) *Attorney, Agent, or Firm* — K&L Gates LLP (57) ABSTRACT

Systems, apparatuses, methods, and computer program products are disclosed for selecting a classification category based on query data. An example method includes receiving query data and requesting a set of classification categories from a set of classification engines. The example method further includes receiving the set of classification categories and, if a leading classification category occurs, selecting a classification category that includes the first leading classification category. The example method further includes, if the leading classification category does not occur, forming a set of partial-digits categories by removing a first predetermined number of digits from each classification category, and if a first leading partial-digits category from the first set of partial-digits categories occurs, selecting a second classification category consistent with the first leading partial-digits category. The example method further includes selecting a ranked priority classification category based on the priority rank for each classification engine.

20 Claims, 7 Drawing Sheets

SYSTEMS AND METHODS FOR AUTOMATED RULE-BASED ANNOTATION AND VALIDATION OF BUSINESS CLASSIFICATION

BACKGROUND

Business/industry classification categories (e.g., North American Industry Classification System (NAICS) business codes) are used in a variety of business and government contexts for record keeping related to economic activity. Classification categories are needed, for example, for tax purposes, for identifying customers, for governmental and/or regulatory interactions, and to add features to datasets describing business activity. The large number of available classification categories may add difficulty to these and other tasks that involve assigning classification categories to a particular business or establishment.

BRIEF SUMMARY

As described above, business/industry classification categories (or classification codes), such as NAICS codes, are important for a number of business operations, particularly in the financial services sector. NAICS codes, and their counterparts in other regions of the world, form a common language and standard for describing economic activity. NAICS codes thus eliminate the need for individuals or institutions to develop their own classification systems, and they enable communication and interoperability for data related to economic activity.

In the context of banking services, bankers may lack expertise, time, and resources to properly validate a given NAICS code attached to a business classification. Given the vast number of NAICS codes, computer assistance is generally needed to assign a code, and search engines (classification engines) are typically used. However, a variety of classification engines exist, and aggregating the results of multiple classification engines while maintaining the most accurate possible results is challenging.

Example embodiments described herein automatically submit queries to a set of classification engines and arrive at a decision based on the results. The user may input query data, such as a short string describing a business (e.g., "pet training daycare" or "frozen yogurt fast food restaurant"). The query data may be processed and formatted and passed to a number of classification engines. The results of the classification engines may be collected and processed through a variety of ranking and manipulation steps to arrive at a single preferred classification category, and optionally one or more secondary recommended classification categories.

Example embodiments disclosed herein evaluate classification categories, including validating and correcting classifications when needed. Example embodiments use data sources and algorithms that are independent of those used to generate classification categories. In one example embodiment, a business description is input to the system and processed by multiple classification engines which calculate scores for how likely the business description is to be assigned one of the over 1,000 NAICS codes. The multiple classification engines may each base their output on different data sources and statistical measures. The classification engines may include an Online Sales and Marketing Platform (OSMP) engine (e.g., which may score and rank NAICS codes based on a web data scrape of over 200,000 business descriptions), a Census engine, a TF-IDF (term frequency-inverse document frequency) engine, a Levenshtein engine, and an Entropy-like engine. Data for some of these engines may come from over 20,000 examples in Census Bureau NAICS association page.

In an example embodiment, the output scores from the engines may be rank-ordered and the top outputs may be presented, from which another algorithm may be used to decide which of the rank-ordered suggestions is the correct NAICS code for the business description. In some embodiments, users may subjectively choose the correct NAICS code.

Accordingly, the present disclosure sets forth systems, computer-implemented methods, and apparatuses that result in technical advances in the field of entity classification. For instance, employees may be able to perform duties involving NAICS codes more accurately and with less training than is currently possible using traditional approaches, while being able to rely on a systematic and repeatable process for finding the appropriate classification category in a situation. Additionally, the selection of any particular classification category (NAICS code) can be easily explained by reviewing the steps of the process disclosed herein, enabling compliance with regulatory requirements in a manner currently unavailable to those using traditional manual or semi-automated techniques.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, these inventions should not be construed as limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "classification category" (or classification code) refers to a numerical value with a fixed number of digits used for classifying and measuring economic activity. The most prominent system of classification categories in North America is North American Industry Classification System (NAICS), which uses six digits. Classification categories, including NAICS codes, use higher digits for broader classification and lower digits for narrower classifications. For example, the first two digits of a NAICS code specify the high-level sector (e.g., 11 refers to agriculture, forestry, fishing, and hunting) while the last two digits refer to an industry and national-level industry. In some embodiments, a subset of the digits of a classification category may be used. For example, the lowest digit, or the national-level industry digit for NAICS codes, may be removed from consideration to form a shorter partial-digits category. The partial-digits category has the advantage that fewer such categories exist, and may be used to form a greater degree of agreement among a field of predictions for classification categories.

The term "classification engine" refers to a function that processes query data to return a classification category. In some embodiments, the query data may be a brief, written description of a business activity, such as "beauty nail salon" or "dogs training daycare." The classification engines calculate scores for how likely the query data (business description) is to be assigned one of the over 1,000 NAICS codes. The multiple classification engines may each base their output on different data sources and statistical measures. Example engines for finding NAICS codes include the Online Sales and Marketing Platform (OSMP) engine (e.g., which may score and rank NAICS codes based on a web data scrape of over 200,000 business descriptions), the Census engine, the TF-IDF (term frequency-inverse document frequency) engine, Levenshtein engines, and entropy-like engines.

The term "leading classification category" refers to, in an instance in which a plurality of classification engines returns classification categories based on query data, a classification category that is returned by more classification engines than any other individual classification category. Stated another way, the leading classification category is the classification category that wins a plurality of votes from the classification engines. If there is a tie for the classification category that is returned by the most classification engines, then no leading classification category occurs. For example, suppose five engines, numbered one through five, each return a unique code. In this example, no leading classification category occurs. For another example, suppose engines one and two return the same classification category, while engines three through five each return unique codes. In this example, the code returned by engines one and two is the leading classification category (i.e., this category wins a plurality of votes).

System Architecture

Figure 1:
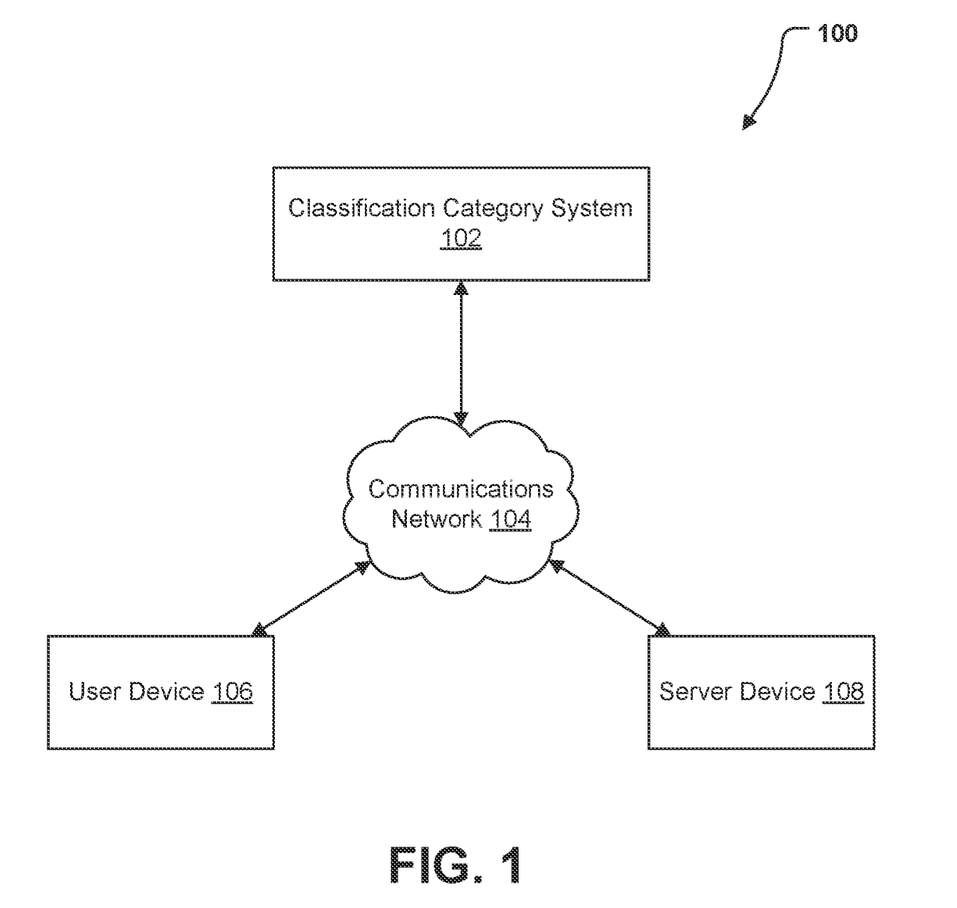
FIG. 1 illustrates a system in which some example embodiments may be used for automatic rule-based annotation and validation of business classification.

Example embodiments described herein may be implemented using any of a variety of computing devices or servers. To this end, FIG. 1 illustrates an example environment 100 within which various embodiments may operate. As illustrated, a classification category system 102 may receive and/or transmit information via communications network 104 (e.g., the Internet) with any number of other devices, such as user device 106 and/or server device 108.

The classification category system 102 may be implemented as one or more computing devices or servers, which may be composed of a series of components. Particular components of the classification category system 102 are described in greater detail below with reference to at least apparatus 200 in connection with FIG. 2.

The user device 106 and the server device 108 may be embodied by any computing devices. The user device 106 and the server device 108 need not themselves be independent devices, but may be peripheral devices communicatively coupled to other computing devices.

Although FIG. 1 illustrates an environment and implementation in which the classification category system 102 interacts indirectly with a user via one or more of user device 106 and/or server device 108, in some embodiments, users may directly interact with the classification category system 102 (e.g., via communications hardware of the classification category system 102), in which case a separate user device 106 and/or server device 108 may not be utilized. Whether by way of direct interaction or indirect interaction via another device, a user may communicate with, operate, control, modify, or otherwise interact with the classification category system 102 to perform the various functions and achieve the various benefits described herein.

Example Implementing Apparatuses

Figure 2:
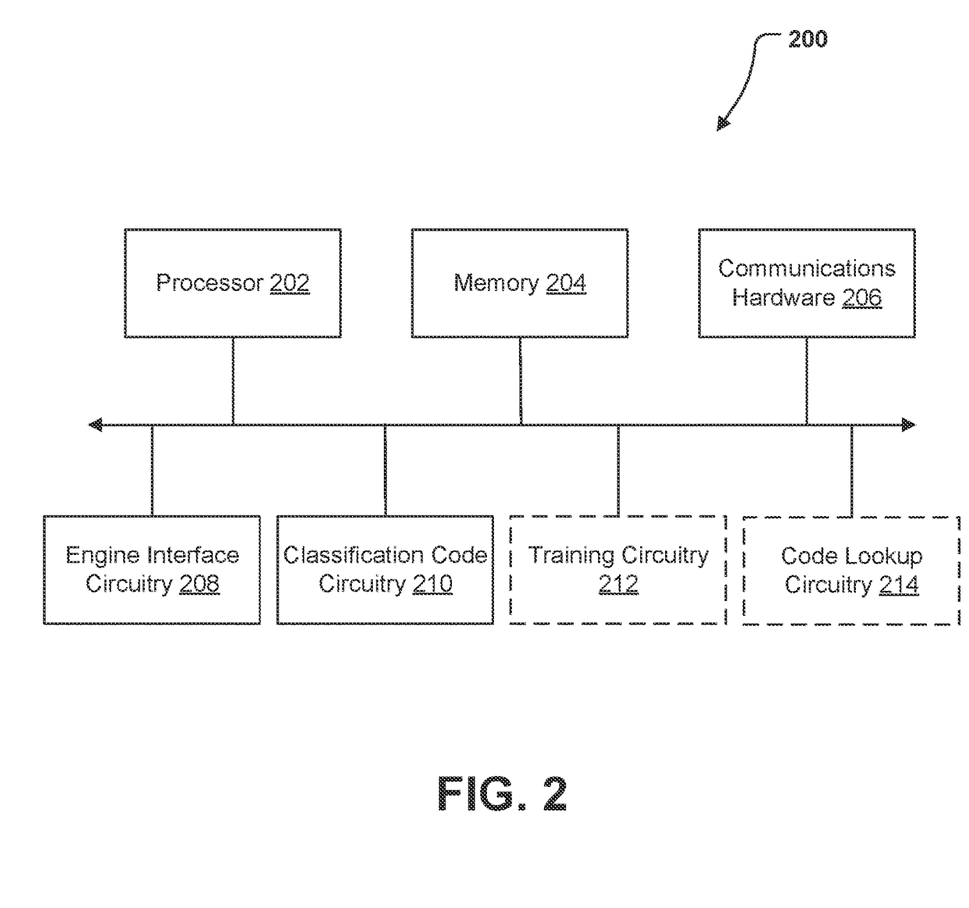
FIG. 2 illustrates a schematic block diagram of example circuitry embodying a system device that may perform various operations in accordance with some example embodiments described herein.

The classification category system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with at least FIGS. 3-4. As illustrated in FIG. 2, the apparatus 200 may include processor 202, memory 204, communications hardware 206, engine interface circuitry 208, classification code circuitry 210, training circuitry 212, and code lookup circuitry 214, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises an engine interface circuitry 208 that requests a set of classification categories from a set of classification engines, receives the set of classification categories from the set of classification engines, and generates a second leading classification category from the first set of partial-digits categories. The engine interface circuitry 208 may utilize processor 202, memory 204, or any other hardware component included in the apparatus 200 to perform these operations, as described in connection with at least FIGS. 3-4 below. The engine interface circuitry 208 may further utilize communications hardware 206 to gather data from a variety of sources (e.g., server device 108 as shown in FIG. 1), and/or exchange data with a user, and in some embodiments may utilize processor 202 and/or memory 204 to interface with various classification engines.

In addition, the apparatus 200 further comprises a classification code circuitry 210 that selects a first classification category, forms a first set of partial-digits categories by removing a first pre-determined number of digits from each classification category from the set of classification categories, generates a second leading classification category from the first set of partial-digits categories, selects a second classification category consistent with the leading partial-digits category, selects a ranked priority classification category based on the priority rank for each classification engine, forms a second set of partial-digits categories by removing a second pre-determined number of digits from each partial-digits category from the first set of partial-digits categories, and selects a third classification category. The classification code circuitry 210 may utilize processor 202, memory 204, or any other hardware component included in the apparatus 200 to perform these operations, as described in connection with at least FIGS. 3-4 below. The classification code circuitry 210 may further utilize communications hardware 206 to gather data from a variety of sources (e.g., user device 106, as shown in FIG. 1), and/or exchange data with a user, and in some embodiments may utilize processor 202 and/or memory 204 to perform manipulation and selection of classification categories.

Further, the apparatus 200 may further comprise a training circuitry 212 that compares training data results to a set of results from sample queries from each classification engine, determines an accuracy estimate for each classification engine based on comparing to the training data results, assigns the priority rank to each classification engine from the set of classification engines based on the corresponding accuracy estimate, and generates training data results by associating the language data to the classification categories. The training circuitry 212 may utilize processor 202, memory 204, or any other hardware component included in the apparatus 200 to perform these operations, as described in connection with at least FIGS. 3-4 below. The training circuitry 212 may further utilize communications hardware 206 to gather data from a variety of sources (e.g., user device 106 or server device 108, as shown in FIG. 1), and/or exchange data with a user, and in some embodiments may utilize processor 202 and/or memory 204 to create and manage training datasets.

Further, the apparatus 200 may further comprise a code lookup circuitry 214 that retrieves estimated carbon emissions data relating to a selected classification category, provides the estimated carbon emissions data relating to the query data, and retrieves estimated investment risk data relating to a selected classification category. The code lookup circuitry 214 may utilize processor 202, memory 204, or any other hardware component included in the apparatus 200 to perform these operations, as described in connection with at least FIGS. 3-4 below. The code lookup circuitry 214 may further utilize communications hardware 206 to gather data from a variety of sources (e.g., user device 106 or server device 108, as shown in FIG. 1), and/or exchange data with a user, and in some embodiments may utilize processor 202 and/or memory 204 to retrieve data linked to a classification category for analysis.

Although components 202-214 are described in part using functional language, it will be understood that the particular implementations necessarily include the use of particular hardware. It should also be understood that certain of these components 202-214 may include similar or common hardware. For example, the engine interface circuitry 208, classification code circuitry 210, training circuitry 212, and code lookup circuitry 214 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the engine interface circuitry 208, classification code circuitry 210, training circuitry 212, and code lookup circuitry 214 may leverage processor 202, memory 204, or communications hardware 206 as described above, it will be understood that any of engine interface circuitry 208, classification code circuitry 210, training circuitry 212, and code lookup circuitry 214 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that engine interface circuitry 208, classification code circuitry 210, training circuitry 212, and code lookup circuitry 214 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of graphical user interfaces and flowcharts.

Example Operations

Turning to FIGS. 3-7, example flowcharts are illustrated that contain example operations implemented by example embodiments described herein. The operations illustrated in FIGS. 3-7 may, for example, be performed by the classification category system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, engine interface circuitry 208, classification code circuitry 210, and/or any combination thereof. It will be understood that user interaction with the classification category system 102 may occur directly via communications hardware 206, or may instead be facilitated by a separate user device 106, as shown in FIG. 1, and which may have similar or equivalent physical componentry facilitating such user interaction.

Figure 3:
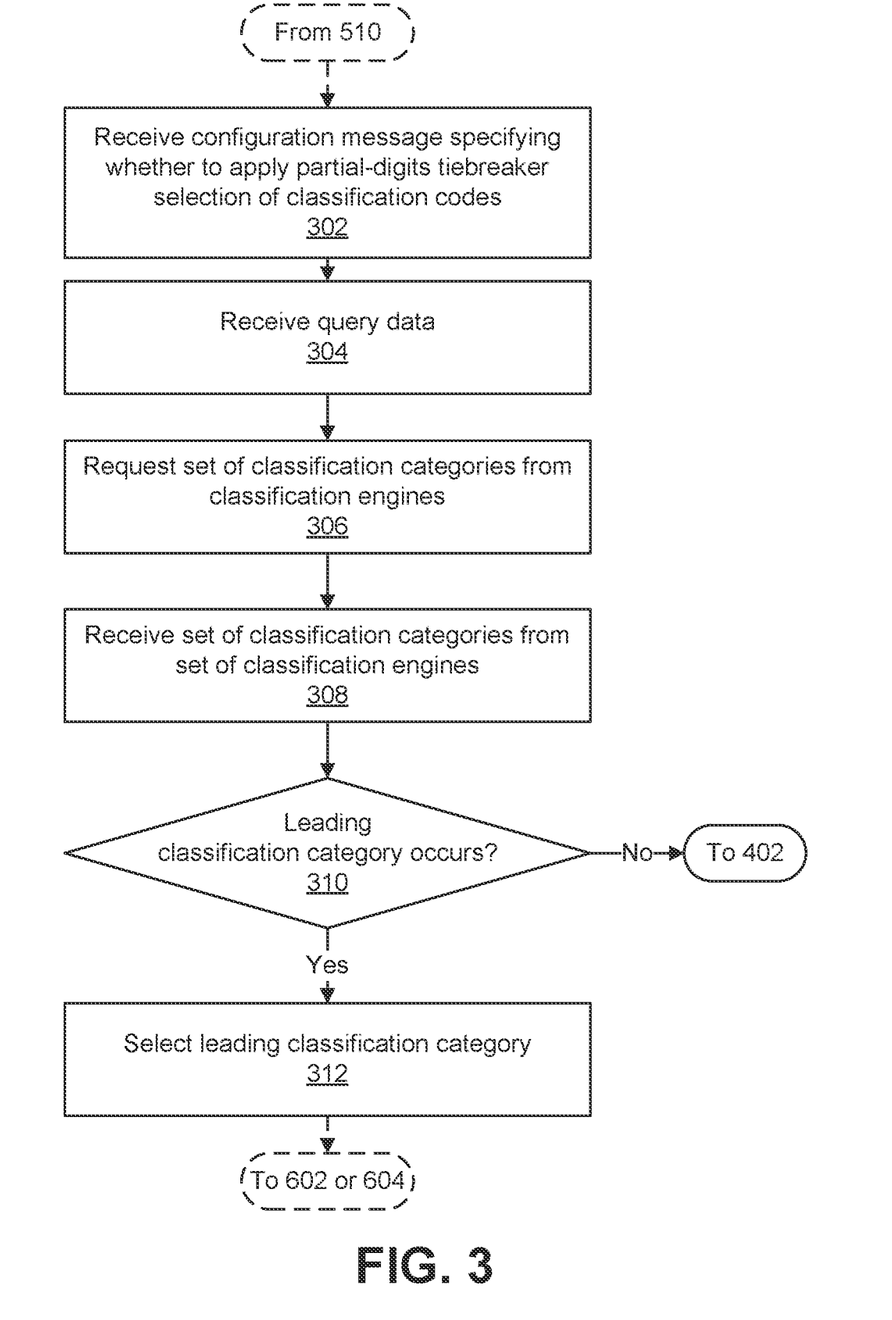
FIG. 3 illustrates an example flowchart for selecting a leading classification category, in accordance with some example embodiments described herein.

Turning first to FIG. 3, example operations are shown for selecting a leading classification category. As shown by operation 302, the apparatus 200 includes means, such as processor 202, memory 204, communications hardware 206, or the like, for receiving, based on user input, a configuration message specifying whether to apply a partial-digits tiebreaker selection of classification categories. The apparatus 200 may receive the configuration message using attached hardware of the communications hardware 206, or the configuration message may originate from a remote device, such as user device 106 or server device 108, and the apparatus 200 may receive the configuration message via attached networking hardware of the communications hardware 206. The configuration message may also be retrieved from storage, e.g., embodied by memory 204. Regardless of the origin of the configuration message, the configuration message may be based on user input, and may specify the configuration of the classification code circuitry 210 in relation to the use of partial-digits tiebreaker selection of classification categories. Operations relating to the partial-digits tiebreaker selection of classification categories are described in detail below, in connection with operation through operation 410 of FIG. 4. The configuration message may be, for example, a plaintext configuration file, a JSON, XML, or YAML configuration file, or the like, and may comprise data indicating whether to apply the partial-digits tiebreaker procedure, for example, as a Boolean value. In some embodiments, the configuration message may further specify whether to apply a second-stage partial-digits tie-breaker procedure, as described in detail with reference to at least FIG. 7.

As shown by operation 304, the apparatus 200 includes means, such as processor 202, memory 204, communications hardware 206, or the like, for receiving the query data. The apparatus 200 may receive the configuration message using attached hardware of the communications hardware 206, or the configuration message may originate from a remote device such as user device 106 or server device 108, and the apparatus 200 may receive the configuration message via attached networking hardware of the communications hardware 206. The configuration message may also be retrieved from storage, e.g., embodied by memory 204, and the query may be received in real-time or retrieved from earlier input. In some embodiments, the query data may be a brief, written description of a business activity, such as "beauty nail salon" or "dogs training daycare," and the query may be formatted as string data. Although a single query is described in the example operations of this section, it will be understood that the query data may comprise multiple queries, and each query may be processed through the example operations described here and in connection with at least FIGS. 3-7.

As shown by operation 306, the apparatus 200 includes means, such as processor 202, memory 204, communications hardware 206, engine interface circuitry 208, or the like, for requesting, based on the query data, a set of classification categories from a set of classification engines. Each classification category comprises a sequence of digits, and each classification engine has a priority rank. The classification category (or classification code) may be a numerical value with a fixed number of digits used for classifying and measuring economic activity. The most prominent system of classification categories in North America is North American Industry Classification System (NAICS), which uses six digits. Classification categories, including NAICS codes, use higher digits for broader classification and lower digits for narrower classifications. For example, the first two digits of a NAICS code specify the high-level sector (e.g., 11 refers to agriculture, forestry, fishing, and hunting) while the last two digits refer to an industry and national-level industry. In some embodiments, a subset of the digits of a classification category may be used. For example, the lowest digit, or the national-level industry digit for NAICS codes, may be removed from consideration to form a shorter partial-digits category. The partial-digits category has the advantage that fewer such categories exist, and may be used to form a greater degree of agreement among a field of predictions for classification categories.

A classification engine may be a function that processes query data to return a classification category. In some embodiments, the query data may be a brief, written description of a business activity, such as "beauty nail salon" or "dogs training daycare." Example engines for finding NAICS codes include the Online Sales and Marketing Platform (OSMP) engine (e.g., which may score and rank NAICS codes based on a web data scrape of over 200,000 business descriptions), the Census engine, the TF-IDF (term frequency-inverse document frequency) engine, Levenshtein engines, and entropy-like engines.

The engine interface circuitry 208 may request the set of classification categories by providing the query data to the classification engines. In some embodiments, the engine interface circuitry 208 may alter (e.g., reformat, tokenize, clean, etc.) the input to provide input in the proper format to each classification engine. The engine interface circuitry 208 may provide the query data to classification engines which are embodied as circuitry of the apparatus 200, or in some embodiments, the engine interface circuitry 208 may transmit the prepared query via communications hardware 206 to the classification engines on a remote device (e.g., server device 108).

As shown by operation 308, the apparatus 200 includes means, such as processor 202, memory 204, communications hardware 206, engine interface circuitry 208, or the like, for receiving the set of classification categories from the set of classification engines. The apparatus 200 may receive the set of classification categories using attached hardware of the communications hardware 206, or the set of classification categories may originate from a remote device such as server device 108, and the apparatus 200 may receive the configuration message via attached networking hardware of the communications hardware 206. The configuration message may also be retrieved from storage, e.g., embodied by memory 204, and the set of classification categories may be received in real-time or retrieved from earlier operations. The engine interface circuitry 208 may receive the query data from the classification engines which are embodied as circuitry of the apparatus 200, or in some embodiments, the engine interface circuitry 208 may transmit the prepared query via communications hardware 206 to the classification engines on a remote device (e.g., server device 108).

As shown by conditional block 310, control may depend on whether a leading classification category occurs. In an instance in which a leading classification category occurs, control may pass to operation 312. In an instance in which a leading classification category does not occur, control may pass to conditional block 402, depicted in FIG. 4. The leading classification category may, in an instance in which a plurality of classification engines returns classification categories based on query data, be a classification category that is returned by more classification engines than any other individual classification category. Put another way, the leading classification category is the classification category that wins a plurality of votes from the classification engines. If there is a tie for the classification category that is returned by the most classification engines, then no leading classification category occurs. For example, suppose five engines, numbered one through five, each return a unique code. In this example, no leading classification category occurs. For another example, suppose engines one and two return the same classification category, while engines three through five each return unique codes. In this example, the code returned by engines one and two is the leading classification category (i.e., this category wins a plurality of votes).

Finally, as shown by operation 312, the apparatus 200 includes means, such as processor 202, memory 204, communications hardware 206, classification code circuitry 210, or the like, for selecting a first classification category, where the first classification category includes the first leading classification category. The classification code circuitry 210 may, in the instance in which the first leading classification category occurs, select the first leading classification category, designating it as the first classification category. As described above, the first leading classification category occurs when there is a single classification category received from the set of classification engines that occurs more frequently than any other classification category. In some embodiments, if the first classification category is selected, control may end at operation 312, or return to the beginning of the operations of FIG. 3 and await further user interaction. In some embodiments, the operations depicted in FIG. 6 may be performed after operation 312.

Figure 4:
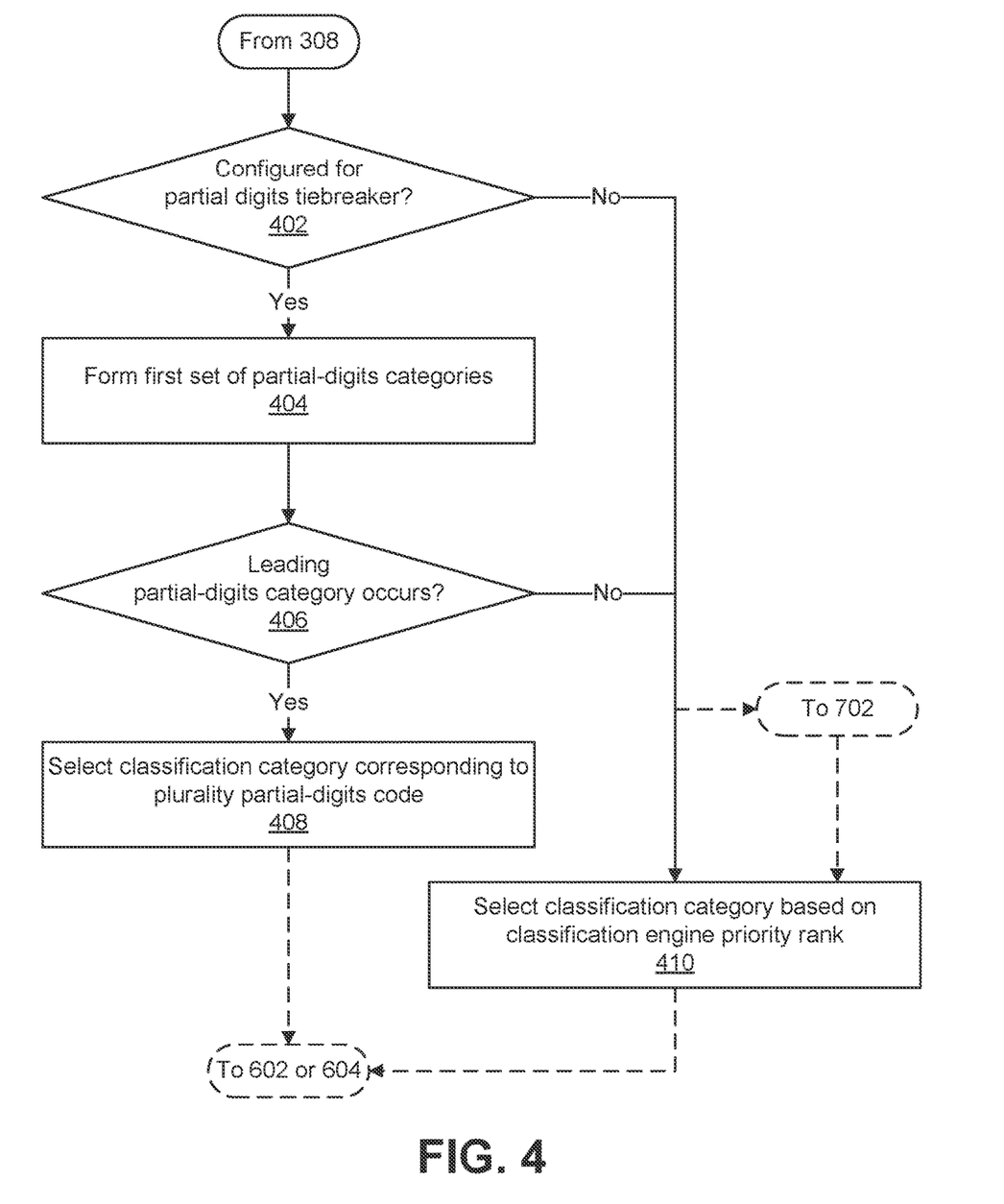
FIG. 4 illustrates an example flowchart for resolving an instance in which the leading classification category does not occur, in accordance with some example embodiments described herein.

Turning now to FIG. 4, example operations are shown for resolving an instance in which the leading classification category does not occur. As shown by conditional block 402, control may depend on whether the classification code circuitry 210 is configured to apply a partial-digits tiebreaker. In an instance in which the classification code circuitry 210 is configured to apply a partial-digits tiebreaker, control may pass to operation 404. In an instance in which the classification code circuitry 210 is not configured to apply a partial-digits tiebreaker, control may pass to operation 410 or, optionally, control may pass to operation 702 of FIG. 7 in some embodiments. The configuration to apply a partial-digits tiebreaker may be based on the configuration message received in connection with operation 302.

As shown by operation 404, the apparatus 200 includes means, such as processor 202, memory 204, communications hardware 206, classification code circuitry 210, or the like, for forming a first set of partial-digits categories by removing a first pre-determined number of digits from each classification category from the set of classification categories. As noted previously, lower digits of classification categories may specify more specific groupings while higher digits of classification categories may specify broader groupings. The classification code circuitry 210 may remove, for example, one or more of the lower digits of each classification category to form a set of partial-digits categories. For example, the classification category "812112" may have two digits removed to form the partial-digits category "8121". By removing digits from each classification category, the likelihood of forming agreement among the classification engines increases, since there are fewer partial-digits categories from among which to choose. For example, among the classification categories "611512", "611513", "611510", and "335139", there is no leading classification category. By removing the lowest digit (e.g., the right-most digit when reading the number from left to right), the partial-digits categories "61151", "61151", "61151", and "33513" are formed, and three of the classification engines are found to agree on the partial-digits category choice.

The partial-digits categories may, in some instances, comprise a leading partial-digits category. Continuing the previous example, given partial-digits categories "61151", "61151", "61151", and "33513", the leading partial-digits category is "61151". The leading partial-digits category may be chosen in the same way as the leading classification category described previously. The leading partial-digits category may be chosen by finding the partial-digits category that occurs more frequently than any other partial-digits category. In an instance in which more than one partial-digits category is tied for the most frequent partial-digits category, the leading partial-digits category does not occur.

As shown by conditional block 406, control may depend on whether a leading partial-digits category occurs. The leading partial-digits category may be found, for example, in operations in connection with operation 404, described above. In an instance in which a partial-digits category occurs, control may pass to operation 408. In an instance in which a partial-digits category does not occur, control may pass to operation 410 or, optionally, control may pass to operation 702 of FIG. 7 in some embodiments.

As shown by operation 408, the apparatus 200 includes means, such as processor 202, memory 204, communications hardware 206, classification code circuitry 210, or the like, for selecting, from the set of classification categories, a second classification category consistent with the first leading partial-digits category. The classification code circuitry 210 may, in the instance in which the leading partial-digits category occurs, select the leading partial-digits category, designating the second classification category based on the leading partial-digits category. As described above, the leading partial-digits category occurs when there is a single partial-digits category derived from the set of classification categories that occurs more frequently than any other partial-digits category. In some embodiments, if the second classification category is selected, control may end at operation 408, or return to the beginning of the operations of FIG. 3 and await further user interaction. In some embodiments, the operations depicted in FIG. 6 may be performed after operation 408.

When selecting the second classification category, the classification code circuitry 210 may base the selection on the leading partial-digits category. In some embodiments, the classification code circuitry 210 may consider the set of set of classification categories that match each digit of the leading partial-digits category. For example, if the leading partial-digits category is "61151", then the classification categories "611512", "611513", "611515", etc. may be considered. In some embodiments, the classification code circuitry 210 may designate the remaining classification categories to consider and repeat the procedures beginning at conditional block 310, using the reduced set of classification categories. In some embodiments, the classification code circuitry 210 may select a classification category immediately by using the priority ranks of the classification engines that correspond to each remaining classification category (e.g., in a manner similar to the procedure described below in connection with operation 410). It will be understood that, in other embodiments, the classification code circuitry 210 may select the second classification category using other procedures and is not limited to the exemplary selection methods described here.

As shown by operation 410, the apparatus 200 includes means, such as processor 202, memory 204, communications hardware 206, classification code circuitry 210, or the like, for selecting a ranked priority classification category based on the priority rank for each classification engine. The classification code circuitry 210 may select the ranked priority classification category by one or more of a variety of methods, some examples of which are given here. The selection of the classification category may be based on the priority rank for each classification engine, and the corresponding classification category received from each engine, thus associating a priority rank for each classification category. In this description, the priority rank will be described interchangeably as ranking the classification categories and ranking the classification engines.

In some embodiments, the ranked priority classification category is returned by a highest-priority-ranked classification engine. For example, for four classification engines numbered 1-4 with classification engine 1 having the highest priority rank, classification engine 2 having the second highest priority rank, and so on, the classification code circuitry 210 may select the classification category received from classification engine 1. In this example, the classification category from classification engine 1 is chosen regardless of the identity of the classification category, regardless of the frequency of the classification category relative to other classification categories, or any other factors.

In some embodiments, the ranked priority classification category is determined by weighting each classification engine according to its priority rank. A numerical weight related to the priority rank of each classification engine may be provided for each classification category obtained from each respective classification engine. The classification code circuitry 210 may then use the weights in a formula to compute the preferred ranked priority classification category. For example, four classification engines numbered 1 through 4 with classification engine 1 having the highest priority rank, classification engine 2 having the second highest priority rank, and so on, may have weights "0.8", "0.7", "0.3", and "0.1", respectively. The classification engines may return the classification categories "611512", "611513", "611513", and "611512", respectively. In this example, the classification code circuitry 210 may use a simple formula of adding up the weights of each classification engine that selects each classification category, so the classification category "611512" may receive a total weight of 0.8+0.1=0.9, and the classification category "611513" may receive a total weight of 0.7+0.3=1.0. In this example, "611513" may be selected as the ranked priority classification category, i.e., it has the greatest priority total weight.

It will be understood that, in other embodiments, the classification code circuitry 210 may select the priority classification category using other procedures not described above, and is not limited to the exemplary selection methods described here. In some embodiments, the operations depicted in FIG. 6 may be performed after operation 410.

Figure 5:
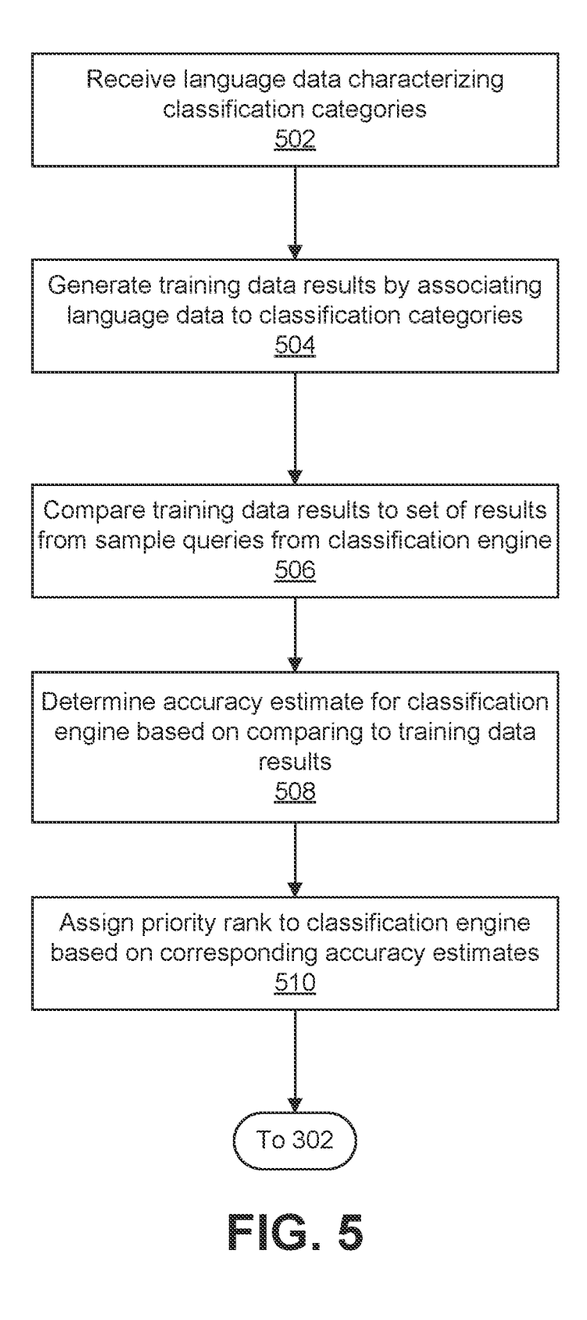
FIG. 5 illustrates an example flowchart for generating training data and providing classification engine rankings, in accordance with some example embodiments described herein.

Turning now to FIG. 5, example operations are shown for generating training data and providing classification engine rankings. As shown by operation 502, the apparatus 200 may include means, such as processor 202, memory 204, communications hardware 206, or the like, for receiving language data characterizing a plurality of training classification categories. The apparatus 200 may receive the configuration message using attached hardware of the communications hardware 206, or the configuration message may originate from a remote device such as user device 106 or server device 108, and the apparatus 200 may receive the configuration message via attached networking hardware of the communications hardware 206. The configuration message may also be retrieved from storage, e.g., embodied by memory 204. The language data may be formatted as a string or set of strings and may comprise further formatting such as tokenization, whitespace, or the like. The language data may comprise descriptions of classification categories that are known to be accurate. For example, the category descriptions for NAICS categories provided by the NAICS Association may serve as language data for characterizing the training classification categories.

As shown by operation 504, the apparatus 200 may include means, such as processor 202, memory 204, communications hardware 206, training circuitry 212, or the like, for generating training data results by associating the language data to the plurality of training classification categories. The training circuitry 212 may form a data structure linking the training classification categories to the language data retrieved in connection with operation 504. The data structure formed by the training circuitry 212 may be designated as the training data results. The training data results may provide a trusted set of results with correct labels for the purpose of determining the accuracy and reliability of a classification engine.

As shown by operation 506, the apparatus 200 may include means, such as processor 202, memory 204, communications hardware 206, training circuitry 212, or the like, for comparing training data results to a set of results from sample queries from a sample classification engine. The training circuitry 212 may provide the sample queries to a sample classification engine, and in some embodiments, the sample queries may be from the training data results, as described in connection with operation 502 through operation 504. In some embodiments, the sample queries may be altered before providing the sample queries to the sample classification engine. For example, the sample queries may be shortened or filtered to provide sample queries that are more similar to realistic user-provided queries. The sample queries may be provided to the sample classification engine, and the results of the queries may be stored as results from the sample queries for further processing in example operations 508 and 510.

As shown by operation 508, the apparatus 200 may include means, such as processor 202, memory 204, communications hardware 206, training circuitry 212, or the like, for determining an accuracy estimate for the sample classification engine based on comparing to the training data results. The training circuitry 212 may determine the accuracy of the sample classification engine by comparing the results of the sample queries to the classification categories from the test data. In an instance in which the result of a sample query (where the sample query corresponds to the language data matching a classification category in the test data) matches the corresponding classification category in the test data, the training circuitry 212 may score the sample query as successful. The total number of successful and unsuccessful sample queries are collected to compute the estimated accuracy (e.g., number of successful sample queries divided by the total number of sample queries).

As shown by operation 510, the apparatus 200 may include means, such as processor 202, memory 204, communications hardware 206, training circuitry 212, or the like, for assigning the priority rank to the sample classification engine based on the corresponding accuracy estimate. The training circuitry 212 may, for example, assign the priority rank to the sample classification engine based on ordering each classification engine by its accuracy. In some embodiments, additional information may be used to rank the classification engines, for example, business needs or prior rankings of classification engines may also be used. The priority rank may be an ordinal ranking of the sample classification engine relative to the full set of classification engines.

Figure 6:
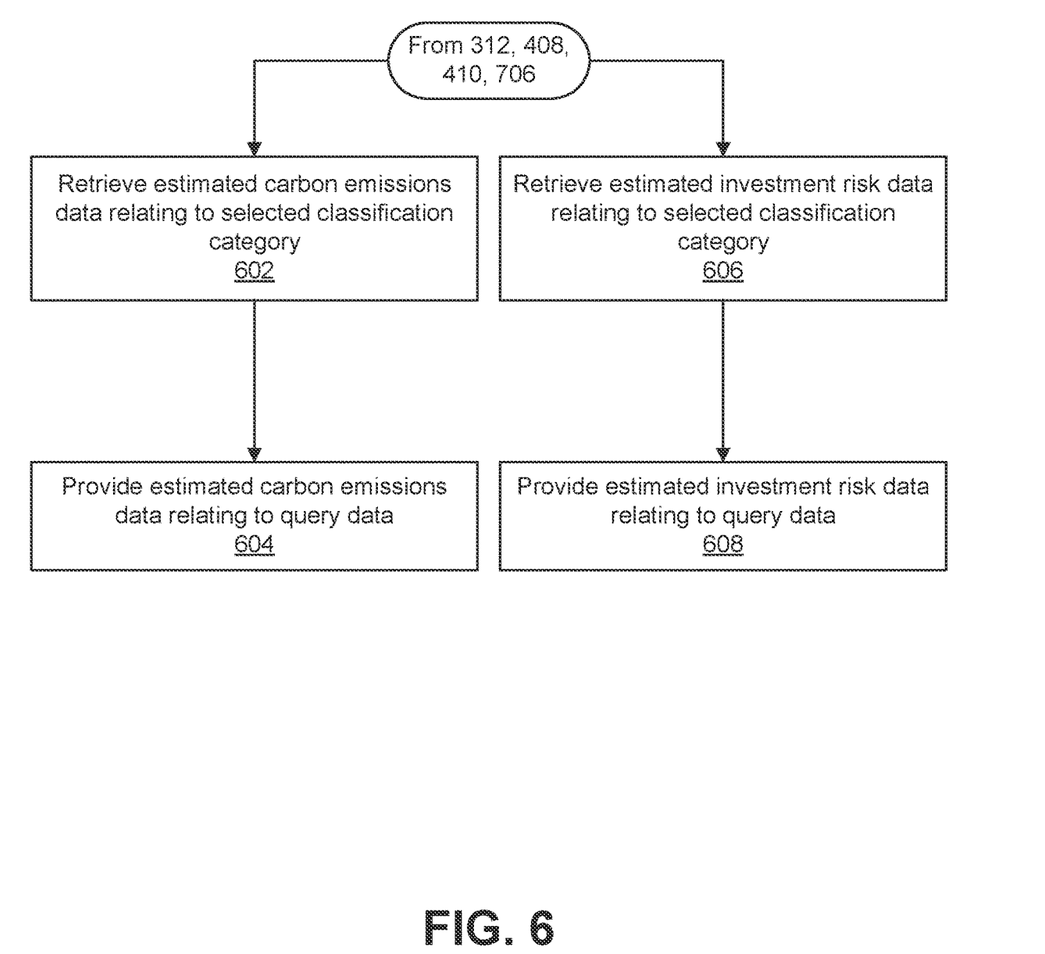
FIG. 6 illustrates an example flowchart for using the selected classification category to characterize data, in accordance with some example embodiments described herein.

Turning now to FIG. 6, example operations are shown for using the selected classification category to characterize data. As shown in FIG. 6, control may pass to operation 602 and/or operation 606, depending on the embodiment. In some embodiments, none of either operation 602 or operation 606 may be executed. In some embodiments, only one of either operations 602 or 606 may be executed, and in some embodiments, both operations 602 and 606 may be executed, either in parallel or sequentially in any order.

As shown by operation 602, the apparatus 200 may include means, such as processor 202, memory 204, communications hardware 206, code lookup circuitry 214, or the like, for retrieving estimated carbon emissions data relating to a selected classification category. The selected classification category may be the first classification category, the second classification category, or the ranked priority classification category. The code lookup circuitry 214 may receive, via the communications hardware 206 or by accessing local storage embodied by memory 204, estimated carbon emissions data. The estimated carbon emissions data may provide average estimated carbon emissions for entities corresponding to a particular classification category. For example, businesses classified in a transportation sector may have higher estimated carbon emissions than businesses classified in an information technology sector. The estimated carbon emissions data may be generated by recording carbon emissions for entities associated with a certain classification category, and calculating the estimated carbon emissions data based on the distribution of recorded historical carbon emissions for entities associated with the classification category.

As shown by operation 604, the apparatus 200 may include means, such as processor 202, memory 204, communications hardware 206, code lookup circuitry 214, or the like, for providing, to a user, the estimated carbon emissions data relating to the query data. The code lookup circuitry 214 may use the estimated carbon emissions data retrieved in connection with example operation 602, and may provide, via communications hardware 206, an estimate of the carbon emissions relating to the queried entity (e.g., a business). In some embodiments, a single classification category may be associated with the queried entity, and the estimated carbon emissions data may be directly provided to the user. In some embodiments, a single entity may be associated with several classification categories (e.g., a business that operates in multiple industries, or several closely related fields) and a more detailed analysis of the carbon emissions may be estimated by considering each of the associated classification categories and their related carbon emissions data.

As shown by operation 606, the apparatus 200 may include means, such as processor 202, memory 204, communications hardware 206, code lookup circuitry 214, or the like, for retrieving estimated investment risk data relating to a selected classification category. The selected classification category may be the first classification category, the second classification category, or the ranked priority classification category. The code lookup circuitry 214 may receive, via the communications hardware 206 or by accessing local storage embodied by memory 204, estimated investment risk data. The estimated investment risk data may provide investment risk estimates averaged or otherwise amalgamated across entities corresponding to a particular classification category. For example, businesses classified in an emerging technology sector may have overall higher risk on average than businesses classified in manufacturing. The estimated investment risk data may be generated by measuring historical investment risk for entities associated with a certain classification category.

As shown by operation 608, the apparatus 200 may include means, such as processor 202, memory 204, communications hardware 206, code lookup circuitry 214, or the like, for providing, to a user, the estimated investment risk data relating to the query data. The code lookup circuitry 214 may use the estimated investment risk data retrieved in connection with example operation 606, and may provide, via communications hardware 206, an estimate of the investment risk relating to the queried entity (e.g., a business). In some embodiments, a single classification category may be associated with the queried entity, and the estimated investment risk data may be directly provided to the user. In some embodiments, a single entity may be associated with several classification categories (e.g., a business that operates in multiple industries, or several closely related fields) and a more detailed analysis of the investment risk may be estimated by considering each of the associated classification categories and their related investment risk data.

Figure 7:
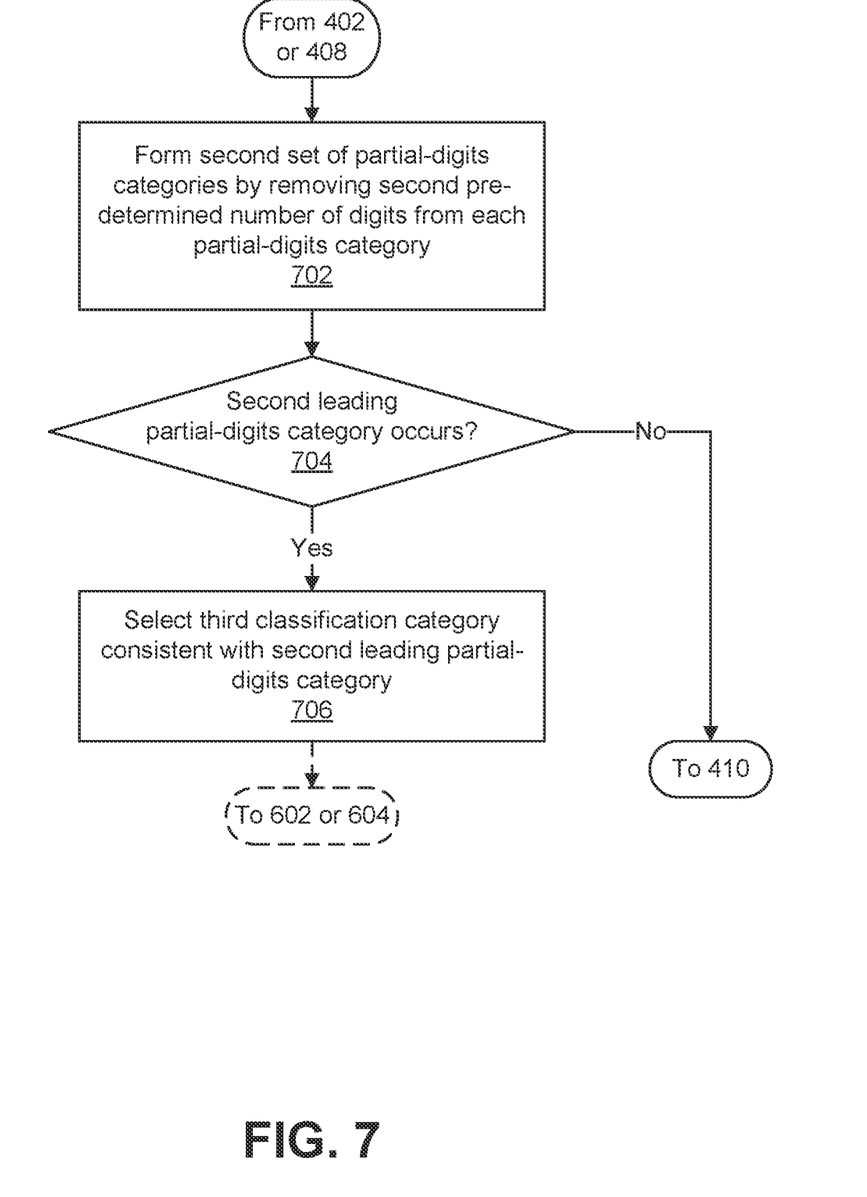
FIG. 7 illustrates an example flowchart for resolving an instance in which the leading partial-digits category does not occur, in accordance with some example embodiments described herein.

Turning now to FIG. 7, example operations are shown for resolving an instance in which the leading partial-digits category does not occur. As shown by operation 702, the apparatus 200 may include means, such as processor 202, memory 204, communications hardware 206, classification code circuitry 210, or the like, for forming a second set of partial-digits categories by removing a second pre-determined number of digits from each partial-digits category from the first set of partial-digits categories. As noted previously, lower digits of classification categories may specify more specific groupings, while higher digits of classification categories may specify broader groupings. In at least one example, when reading a number (i.e., a category) from left to right, the highest digit is the leftmost digit, and the lowest digit is the rightmost digit. The classification code circuitry 210 may remove, for example, one or more of the lower digits of each partial-digits category to form a second set of partial-digits categories. For example, the partial-digits category "81211" may have two digits removed to form the partial-digits category "812". By removing digits from each partial-digits category, the likelihood of forming agreement among the classification engines increases, since there are fewer partial-digits categories from among which to choose. For example, among the partial-digits categories "61150", "61151", "61152", and "33513", there is no leading classification category. By removing the lowest digit, the partial-digits categories "6115", "6115", "6115", and "3351" are formed, and three of the classification engines are found to agree on the second partial-digits category choice.

The second partial-digits categories may, in some instances, comprise a second leading partial-digits category. Continuing the previous example, given second partial-digits categories "6115", "6116". "6117", and "3351", the second leading partial-digits category is "6115". The second leading partial-digits category may be chosen in the same way as the leading classification category and the first leading partial-digits category described previously. The second leading partial-digits category may be chosen by finding the second partial-digits category that occurs more frequently than any other second partial-digits category. In an instance in which more than one second partial-digits category is tied for the most frequent second partial-digits category, the second leading partial-digits category does not occur.

As shown by conditional block 704, control may depend on whether a second leading partial-digits category occurs. The second leading partial-digits category may be found, for example, in operations in connection with operation 702, described above. In an instance in which a second partial-digits category occurs, control may pass to operation 706. In an instance in which a partial-digits category does not occur, control may pass to operation 410 (from FIG. 4).

Finally, as shown by operation 706, the apparatus 200 may include means, such as processor 202, memory 204, communications hardware 206, classification code circuitry 210, or the like, for selecting, from the set of classification categories, a third classification category consistent with the second leading partial-digits category. The classification code circuitry 210 may, in the instance in which the second leading partial-digits category occurs, select the second leading partial-digits category, designating the third classification category based on the second leading partial-digits category. As described above, the second leading partial-digits category occurs when there is a partial-digits category from the second set of partial-digits categories that occurs more frequently than any other partial-digits category. In some embodiments, if the third classification category is selected, control may end at operation 706, or return to the beginning of the operations of FIG. 3 and await further user interaction. In some embodiments, the operations depicted in FIG. 6 may be performed after operation 706.

When selecting the third classification category, the classification code circuitry 210 may base the selection on the second leading partial-digits category. In some embodiments, the classification code circuitry 210 may consider the set of set of classification categories that match each digit of the second leading partial-digits category. For example, if the second leading partial-digits category is "6115", then the classification categories "611512", "611513", "611515", "611523", etc. may be considered. In some embodiments, the classification code circuitry 210 may designate the remaining classification categories to consider and repeat the procedures beginning at conditional block 310, using the reduced set of classification categories. In some embodiments, the classification code circuitry 210 may select a classification category immediately by using the priority ranks of the classification engines that correspond to each remaining classification category (e.g., in a manner similar to the procedure described below in connection with operation 410). It will be understood that, in other embodiments, the classification code circuitry 210 may select the third classification category using other procedures and is not limited to the exemplary selection methods described here.

It will be understood that, in the example operations described herein, (in particular, operations 312, 408, 410, and 706) a single classification category need not be selected, and in some embodiments, multiple classification categories may be provided to the user. For example, a leading classification category may be selected in accordance with the procedure described in connection with example operation 312, and the remaining, unselected classification categories may be presented as secondary and tertiary alternative choices. Alternative choices may be ranked by any method, including example methods contemplated herein, such as ranking the remaining classification categories according to priority rank of the corresponding classification engines.

FIGS. 3-7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved annotation and validation of business classifications. Example embodiments thus provide tools that overcome the problems faced by business, governmental organizations, or any institutions seeking to classify and study economic activity. Moreover, embodiments described herein avoid relying on a single classification engine (search engine) or creating an opaque "black box" solution that may create difficulties for regulation.

As these examples all illustrate, example embodiments contemplated herein provide technical solutions that solve real-world problems faced working with business classification categories, including NAICS codes. And while business activity classification has been an issue for decades, innovations contemplated herein have unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for selecting a classification category based on query data, the method comprising:
    receiving, by communications hardware and based on user input, a configuration message specifying whether to apply a partial-digits tiebreaker selection of classification categories;
    receiving, by the communications hardware, the query data;
    requesting, by engine interface circuitry and based on the query data, a set of classification categories from a set of classification engines, wherein each classification category comprises a sequence of digits, wherein each classification engine has a priority rank;
    receiving, by the engine interface circuitry, the set of classification categories from the set of classification engines;

in an instance in which a first leading classification category from the set of classification engines occurs, selecting, by classification code circuitry, a first classification category, wherein the first classification category comprises the first leading classification category;

in an instance in which the first leading classification category does not occur and the classification code circuitry is configured to apply a partial-digits tiebreaker:

forming, by the classification code circuitry, a first set of partial-digits categories by removing a first pre-determined number of digits from each classification category from the set of classification categories, and in an instance in which a first leading partial-digits category from the first set of partial-digits categories occurs, selecting, by the classification code circuitry and from the set of classification categories, a second classification category consistent with the first leading partial-digits category; and in an instance in which the first leading classification category does not occur and the first leading partial-digits category does not occur, selecting, by the classification code circuitry, a ranked priority classification category based on the priority rank for each classification engine.

2. The method of claim 1, further comprising:

comparing, by training circuitry, training data results to a set of results from sample queries from a sample classification engine;

determining, by the training circuitry, an accuracy estimate for the sample classification engine based on comparing the training data results to the set of results from the sample queries from the sample classification engine; and assigning, by the training circuitry, the priority rank to the sample classification engine based on the accuracy estimate.

3. The method of claim 1, further comprising:

receiving, by the communications hardware, language data characterizing a plurality of training classification categories; and generating, by training circuitry, training data results by associating the language data to the plurality of training classification categories.

4. The method of claim 1, further comprising:

retrieving, by code lookup circuitry, estimated carbon emissions data relating to a selected classification category, wherein the selected classification category is the first classification category, the second classification category, or the ranked priority classification category; and providing, by the communications hardware and to a user, the estimated carbon emissions data relating to the query data.

5. The method of claim 1, further comprising:

retrieving, by code lookup circuitry, estimated investment risk data relating to a selected classification category, wherein the selected classification category is the first classification category, the second classification category, or the ranked priority classification category; and providing, by the communications hardware and to a user, the estimated investment risk data relating to the query data.

6. The method of claim 1, further comprising:

in an instance in which the first leading classification category does not occur, the first leading partial-digits category does not occur, and the classification code circuitry is configured to apply the partial-digits tiebreaker:

forming, by the classification code circuitry, a second set of partial-digits categories by removing a second pre-determined number of digits from each partial-digits category from the first set of partial-digits categories, and in an instance in which a second leading partial-digits category from the second set of partial-digits categories occurs, selecting, by the classification code circuitry and from the set of classification categories, a third classification category consistent with the second leading partial-digits category.

7. The method of claim 1, wherein the ranked priority classification category is returned by a highest-priority-ranked classification engine.

8. The method of claim 1, wherein the ranked priority classification category is determined by weighting each classification engine according to its priority rank.

9. An apparatus for selecting a classification category based on query data, the apparatus comprising:

communications hardware configured to:

receive, based on user input, a configuration message specifying whether to apply a partial-digits tiebreaker selection of classification categories, and receive the query data;

engine interface circuitry configured to:

request, based on the query data, a set of classification categories from a set of classification engines, wherein each classification category comprises a sequence of digits, wherein each classification engine has a priority rank, and receive the set of classification categories from the set of classification engines;

classification code circuitry configured to:

in an instance in which a first leading classification category from the set of classification engines occurs, select a first classification category, wherein the first classification category comprises the first leading classification category, in an instance in which the first leading classification category does not occur and the classification code circuitry is configured to apply a partial-digits tiebreaker:

form a first set of partial-digits categories by removing a first pre-determined number of digits from each classification category from the set of classification categories; and in an instance in which a first leading partial-digits category from the first set of partial-digits categories occurs, select, from the set of classification categories, a second classification category consistent with the first leading partial-digits category, and in an instance in which the first leading classification category does not occur and the first leading partial-digits category does not occur, select a ranked priority classification category based on the priority rank for each classification engine.

10. The apparatus of claim 9, further comprising training circuitry configured to:

compare training data results to a set of results from sample queries from a sample classification engine;

determine an accuracy estimate for the sample classification engine based on comparing the training data results to the set of results from the sample queries from the sample classification engine; and assign the priority rank to the sample classification engine based on the accuracy estimate.

11. The apparatus of claim 9, wherein the communications hardware is further configured to receive language data characterizing a plurality of training classification categories, wherein the apparatus further comprises:

training circuitry configured to generate training data results by associating the language data to the plurality of training classification categories.

12. The apparatus of claim 9, further comprising code lookup circuitry configured to retrieve estimated carbon emissions data relating to a selected classification category, wherein the selected classification category is the first classification category, the second classification category, or the ranked priority classification category;

wherein the communications hardware is further configured to provide, to a user, the estimated carbon emissions data relating to the query data.

13. The apparatus of claim 9, further comprising code lookup circuitry configured to retrieve estimated investment risk data relating to a selected classification category, wherein the selected classification category is the first classification category, the second classification category, or the ranked priority classification category;

wherein the communications hardware is further configured to provide, to a user, the estimated investment risk data relating to the query data.

14. The apparatus of claim 9, wherein the classification code circuitry is further configured to, in an instance in which the first leading classification category does not occur, the first leading partial-digits category does not occur, and the classification code circuitry is configured to apply the partial-digits tiebreaker:

form a second set of partial-digits categories by removing a second pre-determined number of digits from each partial-digits category from the first set of partial-digits categories; and in an instance in which a second leading partial-digits category from the second set of partial-digits categories occurs, select, from the set of classification categories, a third classification category consistent with the second leading partial-digits category.

15. The apparatus of claim 9, wherein the ranked priority classification category is returned by a highest-priority-ranked classification engine.

16. The apparatus of claim 9, wherein the ranked priority classification category is determined by weighting each classification engine according to its priority rank.

17. A computer program product for selecting a classification category based on query data, the computer program product comprising at least one non-transitory computer-readable storage medium storing software instructions that, when executed, cause an apparatus to:

receive, based on user input, a configuration message specifying whether to apply a partial-digits tiebreaker selection of classification categories;

receive the query data;

request, based on the query data, a set of classification categories from a set of classification engines, wherein each classification category comprises a sequence of digits, wherein each classification engine has a priority rank;

receive the set of classification categories from the set of classification engines;

in an instance in which a first leading classification category from the set of classification engines occurs, select a first classification category, wherein the first classification category comprises the first leading classification category;

in an instance in which the first leading classification category does not occur and the apparatus is configured to apply a partial-digits tiebreaker:

form a first set of partial-digits categories by removing a first pre-determined number of digits from each classification category from the set of classification categories, and in an instance in which a first leading partial-digits category from the first set of partial-digits categories occurs, select, from the set of classification categories, a second classification category consistent with the first leading partial-digits category; and in an instance in which the first leading classification category does not occur and the first leading partial-digits category does not occur, select a ranked priority classification category based on the priority rank for each classification engine.

18. The computer program product of claim 17, wherein the software instructions further cause the apparatus to:

compare training data results to a set of results from sample queries from a sample classification engine;

determine an accuracy estimate for the sample classification engine based on comparing the training data results to the set of results from the sample queries from the sample classification engine; and assign the priority rank to the sample classification engine based on the accuracy estimate.

19. The computer program product of claim 17, wherein the software instructions further cause the apparatus to:

receive language data characterizing a plurality of training classification categories; and generate training data results by associating the language data to the plurality of training classification categories.

20. The computer program product of claim 17, wherein the software instructions further cause the apparatus to:

retrieve estimated carbon emissions data relating to a selected classification category, wherein the selected classification category is the first classification category, the second classification category, or the ranked priority classification category; and provide, to a user, the estimated carbon emissions data relating to the query data.

* * * * *